(12) United States Patent
Rice et al.

(10) Patent No.: US 7,952,052 B2
(45) Date of Patent: May 31, 2011

(54) WELDING TORCH MAINTENANCE CENTER

(75) Inventors: Jody Rice, Waterloo (CA); Naseem Kteily, Waterloo (CA)

(73) Assignee: Nasarc Technologies Inc., Waterloo (CA)

( * ) Notice: Subject to any disclaimer, the term of this patent is extended or adjusted under 35 U.S.C. 154(b) by 188 days.

(21) Appl. No.: 10/558,329

(22) PCT Filed: May 26, 2004

(86) PCT No.: PCT/CA2004/000775
§ 371 (c)(1),
(2), (4) Date: Mar. 29, 2006

(87) PCT Pub. No.: WO2004/103632
PCT Pub. Date: Dec. 2, 2004

(65) Prior Publication Data
US 2006/0231538 A1    Oct. 19, 2006

(30) Foreign Application Priority Data
May 26, 2003   (CA) .................................... 2429974

(51) Int. Cl.
*B21J 13/08*   (2006.01)
*B23K 9/32*   (2006.01)

(52) U.S. Cl. ...... 219/161; 219/136; 228/44.3; 228/44.5; 228/47.1; 269/256; 269/268; 15/93.1

(58) Field of Classification Search .................. 219/136, 219/158, 161; 269/256, 268; 228/44.3, 44.5, 228/47.1; 15/93.1
See application file for complete search history.

(56) References Cited

U.S. PATENT DOCUMENTS

| | | | |
|---|---|---|---|
| 4,583,257 A | 4/1986 | Bridges et al. | |
| 4,733,050 A * | 3/1988 | Grafius | 219/125.1 |
| 5,221,826 A * | 6/1993 | Lee et al. | 219/136 |
| 6,315,186 B1* | 11/2001 | Friedl et al. | 228/102 |
| 6,621,051 B2 | 9/2003 | Simond | |
| 2001/0013511 A1* | 8/2001 | Hong | 219/124.34 |
| 2002/0117490 A1* | 8/2002 | Simond | 219/136 |
| 2003/0024917 A1* | 2/2003 | Thielmann | 219/136 |

FOREIGN PATENT DOCUMENTS

| | | | |
|---|---|---|---|
| GB | 2028688 A | * | 3/1980 |
| JP | 63264272 A | * | 11/1988 |
| JP | 02205265 A | * | 8/1990 |
| JP | 07276054 | * | 10/1995 |
| JP | 2002361431 A | * | 12/2002 |

* cited by examiner

*Primary Examiner* — Kiley Stoner
*Assistant Examiner* — Devang R Patel
(74) *Attorney, Agent, or Firm* — Stephen B. Salai, Esq.; Brian B. Shaw, Esq.; Harter Secrest & Emery LLP

(57) ABSTRACT

A welding torch maintenance center that uses a microcontroller to control the operation, to configure the maintenance center, to repeat the reaming process for excessive spatter deposit inside the nozzle, to spray the nozzle with anti-spatter fluid, to cut the welding wire, to provide a tool center point check signal, and to provide diagnostic information.

28 Claims, 17 Drawing Sheets

WELDING TORCH MAINTENANCE CENTER

FIELD OF THE INVENTION

This invention relates to a welding torch maintenance center. Specifically, this invention relates to a torch maintenance center having a microcontroller to control the operation.

BACKGROUND OF THE INVENTION

Gas metal arc welding, commonly known as MIG (metal inert gas) welding, is a frequently used high deposition rate, semiautomatic welding process. A welding torch for MIG welding (e.g. described in U.S. Pat. No. 2,836,705) has a torch body that conducts electricity, receives a consumable welding wire, and has a diffuser that directs a shielding gas around a welding arc. During the welding process the electrical arc that extends between the welding wire and metal surfaces being welded is shielded within a gas flow.

It is well known in the welding industry that molten material or weld spatter generated by the welding arc is a major problem. During the welding process the spatter adheres to the nozzle. The spatter is made of the elements found in pieces being welded and the welding wire. The spatter is therefore prone to oxidization. Once spatter begins to attach to the nozzle, it continues to build up and oxidize and eventually restrict the flow of shielding gas to the weld. This results in a poor quality weld and eventually the destruction of the nozzle. If a robotic unit on a production line is doing the welding, this results in downtime for the whole production line.

A welding torch maintenance center (also called a reamer) for welding devices has been described in U.S. Pat. No. 4,583,257. In this embodiment, a base plate carries an axially advance able reaming head. A V-block and clamp head are aligned on the plate to locate and secure a robot-positioned welding torch nozzle in a vertical attitude. After clamping the nozzle in position, the reaming head is advanced into the nozzle bore to remove accumulated internal weld spatter. Typically, the reaming head is driven directly by a pressurized-air driven motor. The supply of the pressurized air is regulated by solenoid valves. The interface between the robot and the reamer is through the use of relay control between the reamer and other automation equipments. Other examples of reamers are described in U.S. Pat. Nos. 4,702,195; 4,834,280; 5,845,357; 6,023,045, 6,399,917, and Canadian patent CA2037489. Commercial versions of torch reamers can be found in http://www.binzel-abicor.com, http://www.toughgun.com, and http://www.thermadyne.com.

A disadvantage of the prior art reamers is that if the nozzle is not aligned concentrically with the cutter, because of the possibly asymmetrical nature of the spatter deposits on the walls of the nozzle, then the cutter removes part of the nozzle. This results in thermal distortion in the nozzle, leading to rapid welding torch failure.

Therefore, the existing welding torch nozzle cleaning stations have limited ability to ensure good quality nozzle cleaning.

In existing welding torch nozzle cleaning stations, the coordination of the sequence to place the torch nozzle on the reamer and the reaming process is ensured through the relay logics to control the signals between the robot and the reamer. Depending on the polarity of the power supply the relay logic can either control the supply of a positive pole (sourcing I/O) of the power supply or the 0 V return of the power supply (sinking I/O).

The pneumatic or relay logic of the existing reamers cannot automatically change from one configuration to the other; it is necessary to use adjust switches or jumpers by opening the enclosure and making adjustments inside the reamer.

To hold the nozzle, existing reamers have a stationary V-block and a pair of clamp, requiring manual adjustment and different V-blocks for different sizes of the nozzle.

Existing welding torch nozzle cleaning stations must position the torch nozzle by 'trial and error' procedures because they do not provide a means for programming the position at the point of use without additional equipment.

In the area of fault management and diagnostics the existing welding torch nozzle cleaning stations have very limited capabilities. They do not provide an indication that the entire reaming process has been completed successfully, in case of a failed operation they do not provide an error signal to the robot because of the lack of diagnostic capability and they do not have the capability to automatically retry if a problem (i.e. a stall) occurs during the reaming process.

Existing reamers do not have the capability to monitor or regulate the speed of the air-driven reaming motor, and to adjust the solenoids by changing the average amount of current drawn from the robot power supply.

Furthermore, current welding torch nozzle cleaning stations are not capable to communicate with other automation equipment on a communication network. Setup procedures and data acquisition may assist personnel in various activities required for plant management from various equipment communicating on a network. Existing welding torch nozzle cleaning stations may be equipped with an anti-spatter spray mechanism. This mechanism may be actuated synchronous with nozzle reaming or on its own. The anti-spatter fluid is atomized and sprayed into the nozzle in order to deter further spatter from adhering to the inside bore of the nozzle. A portion of the spray may inadvertently spray outside of the nozzle and into the atmosphere. When this portion of over spray falls and mixes with spatter cleaned out of the nozzle from the reaming process it creates a sticky tar on the supporting platform, which is difficult to clean.

Existing anti-spatter spray mechanisms do not monitor and are not capable of informing the operator when to refill the fluid reservoir.

The length of consumable welding wire sticking out from the end of the contact tip inside the nozzle is not always a consistent length. It is desirable to cut this wire to a predetermined length. Existing welding torch nozzle cleaning stations may be equipped with a wire cutter. The wire cutter may be stand alone or integrated with the reaming device. In the latter case, the start signal for the wire cutter is the same as the start signal for the reamer. The torch is positioned differently for each process, but the start signal will actuate both operations (reaming and wire cutting). The "finished" signal to the robot is not active until entire reaming process has been completed.

Existing welding torch nozzle cleaning stations check the positional accuracy of the end of the wire (tool center point) by moving the torch to a taught point such that the tip of the wire is at the vertex of a tapered cone so that the accuracy may be visually checked. Another mechanism for feeding back a positive verification of the end of the wire is a limit switch. The feedback device is stand-alone and a separate signal must be accommodated for it.

Existing nozzle cleaning stations and wire cutters do not provide a means of bypassing any sensors installed on the unit.

Existing nozzle cleaning stations do not provide a means to trial run the reaming operation.

Existing nozzle cleaning stations do not provide a way to cool the nozzle.

Existing nozzle cleaning stations may be operated by electrical signals or proximity signals mounted at or near the operative mechanism (reaming header, sprayer, wire cutter). The proximity signals activate the operative mechanism immediately; the power supply (air/electrical) must be disconnected in order to teach a proper position with the robot without actuating the mechanism.

SUMMARY OF THE INVENTION

In accordance with one aspect of the present invention there is provided a maintenance center for cleaning a welding torch nozzle comprising: (a) a reaming head for reaming a torch nozzle; (b) a motor driving means for rotating the reaming head about an axis of rotation; (c) a clamp assembly for holding the nozzle in concentric relation to said rotation axis; (d) means for monitoring speed of the motor rotating reaming head; (e) means for advancing and retracting the reaming head; (f) means for detecting selected sensing position(s) of said advancing and retracting means; (g) an electronic operation controller operatively connected to means (d) (e) and (f) and capable of detecting an abnormality in the detected information and responding thereto by taking a corrective action.

The microcontroller controls the operation of the clamp cylinder, the lift cylinder and the motor. In a preferred embodiment the microcontroller receives success or fault information relevant to the operation, provides feedback to user, determines the polarity of outputs and inputs between the station and a robot, and controls the operation of the reamer.

In accordance with another aspect of the present invention there is provided a microcontroller program product comprising: a memory having microcontroller-readable code embedded therein for controlling the operation of a maintenance center for cleaning a welding torch nozzle comprising: code means for monitoring speed of the rotating reaming head; code means for advancing and retracting the reaming head; code means for sensing position of said advancing and retracting means; and code means for detecting an abnormality in the detected information and responding thereto by taking a corrective action.

An object of the present invention is to provide a novel welding torch maintenance center.

One advantage of the present invention is that the welding torch nozzle maintenance center uses an electronic operation controller to control the operation, to provide diagnostic information to other automation equipments and to provide feedback to the users. The system uses solid-state transistors to operate the pneumatic solenoids for enhanced reliability.

The foregoing objects and advantages of the present invention will become apparent to those skilled in the art to which this invention relates as this specification proceeds. The invention is herein described by reference to the accompanying illustrative embodiment forming a part hereof, which includes a description of the best mode known to the applicant, in which:

DETAILED DESCRIPTION OF THE INVENTION

Figure 1:
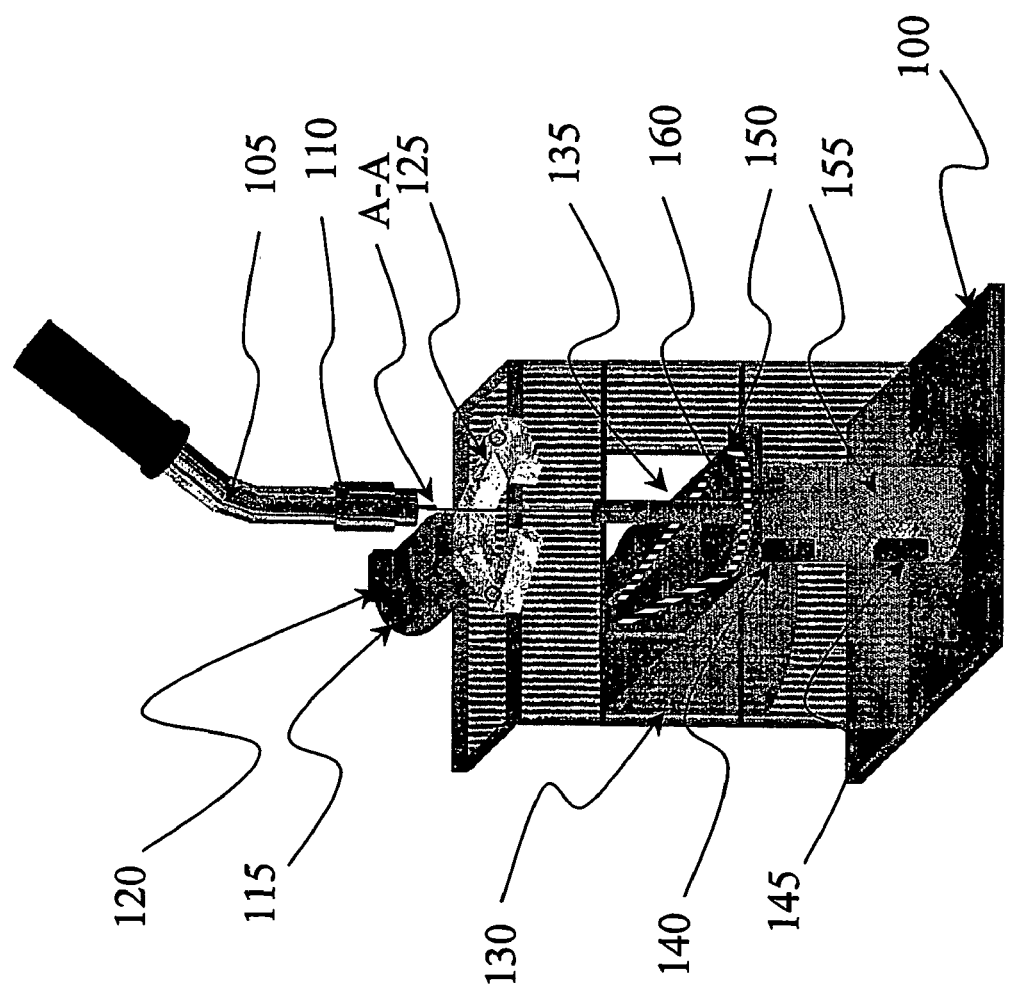
FIG. 1 is a front schematic view of a preferred embodiment of a welding torch maintenance center or a reamer.
Figure 2:
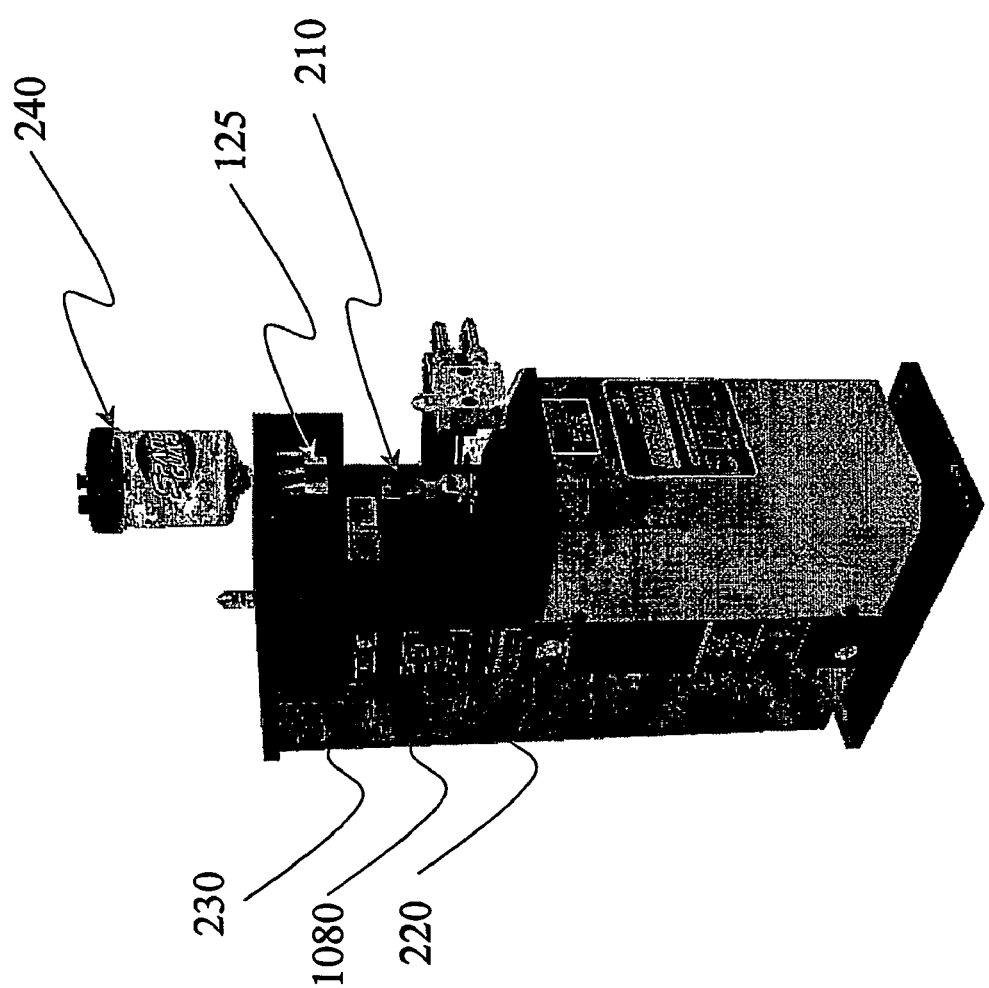
FIG. 2 is a front perspective view of a preferred embodiment of the maintenance center.

FIG. 1 is a schematic view of a preferred embodiment of a welding torch maintenance center, or reamer. Referring to FIGS. 1 and 2, the maintenance center comprises a chassis 100 having a clamp assembly 125 mounted on an upper portion thereof to hold a torch nozzle 110. A pneumatically operated clamp cylinder 115 operates the clamp assembly. A clamp reed switch 120 monitors the movement of the clamp cylinder. An air driven motor 130 is connected by a driving belt to a transmission wheel 160 fixed to a vertically disposed rotatable shaft 135 having fixed on its upper end a reaming head 210 which rotates about and along shaft rotation axis A-A. A frame assembly 150 holds the motor 130, the transmission wheel 160 and the rotatable shaft 135 in fixed position relative to each other for movement together as a unit. A lift cylinder 155 on the chassis 100 is connected to the frame assembly 150 to lift and lower the frame assembly thus moving the reaming head 210 along the rotation axis A-A. The vertical movement of the lift cylinder 155 is monitored by an upper reed switch 140 and a lower reed switch 145. A container 240 for anti-spatter fluid is mounted on top of the maintenance center.

Figure 5:
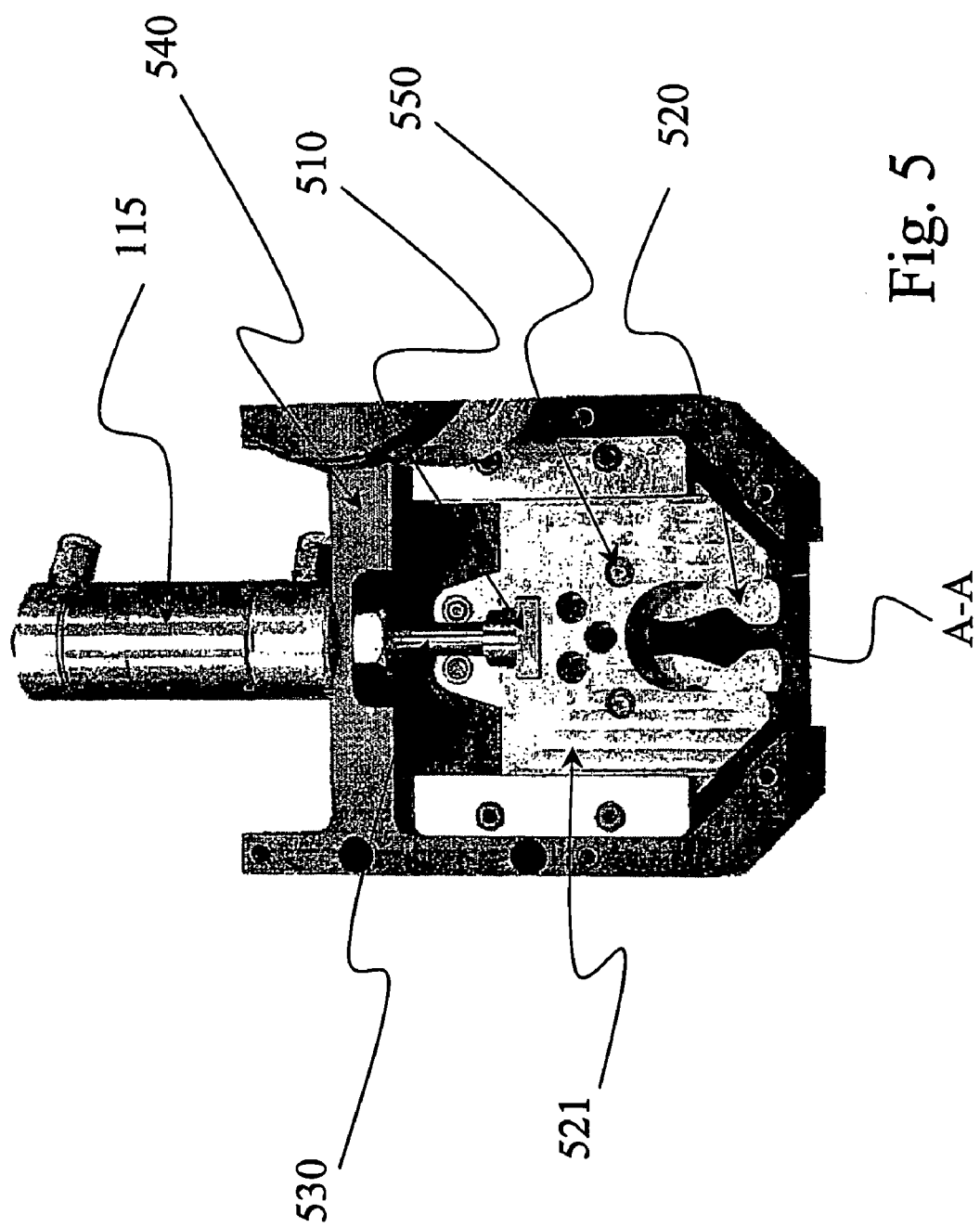
FIG. 5 is a top view of a clamp assembly in closed position.
Figure 6:
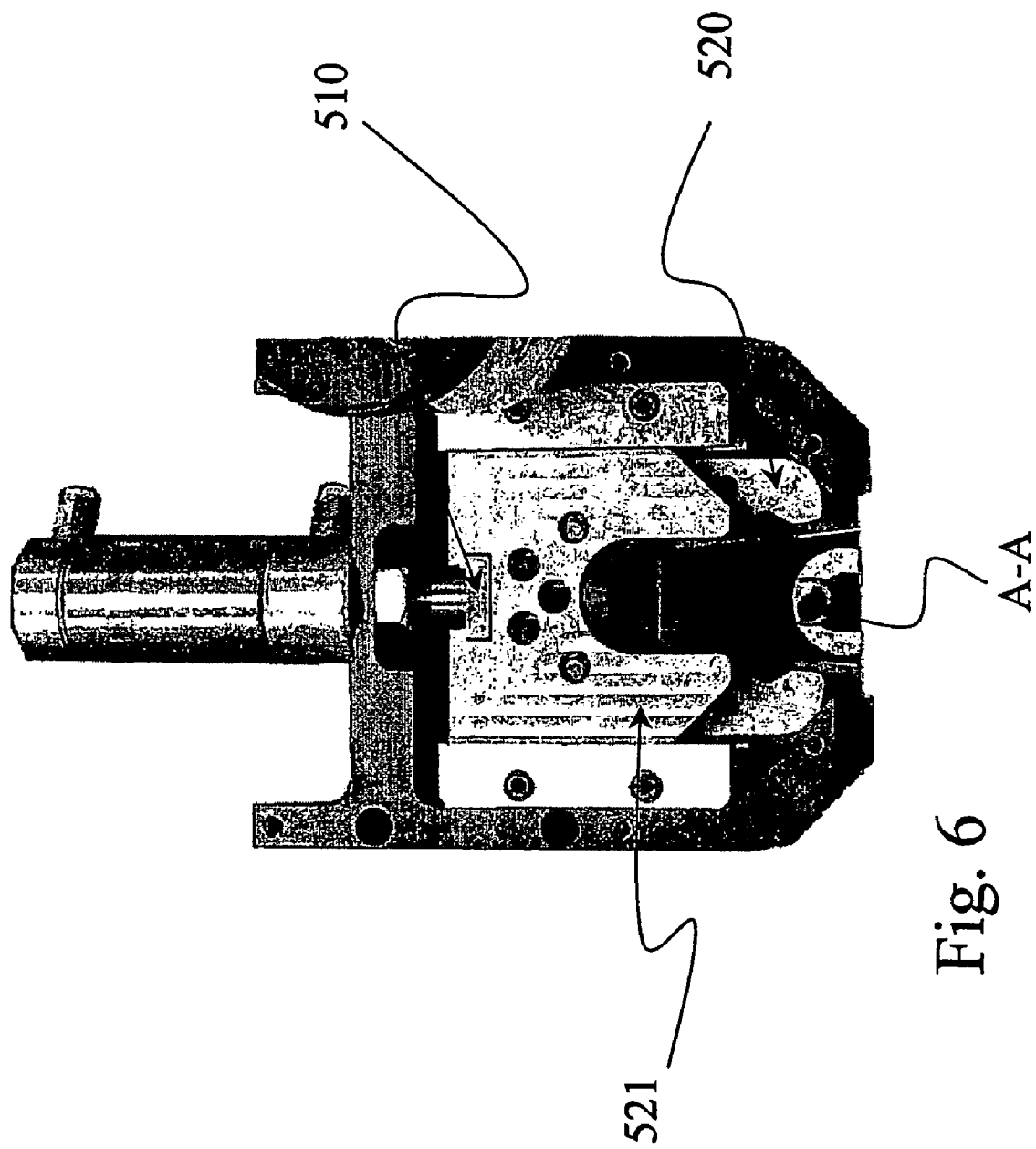
FIG. 6 is a top view of a clamp assembly in open position.

Referring to FIGS. 1, 5 and 6, the clamp assembly 125 serves to center the nozzle on rotation axis A-A. It comprises a housing 540, within which is disposed a slider 521, and a pair of opposed pivotally mounted jaws 520, for engaging the nozzle (not shown) between the jaws. The slider is connected to the clamp cylinder 115 through the T-nut 510, and the clamp cylinder shaft 530 and as slider 521 moves back and forth the links 550 (dowel pins) cause the jaws 520 to open and close. The overall geometry of the clamp mechanism, e.g. length of links and positions and spacing of pivots for jaws 520 ensure that the center of the nozzle is always automatically aligned with rotation axis A-A and the center of the reaming head for all reasonable sizes of torch nozzles.

The welding torch maintenance center uses an electronic operation controller to control the operation, to provide diagnostic information to other automation equipments, and to provide feedback to the users. The torch nozzle positioning can be programmed at the point of use without additional equipment.

Referring to FIGS. 1 to 4, during the removal of the spatter build-up inside the nozzle 110, the reaming process comprises the following sequence: The robot (not shown) positions the nozzle 110 of the torch 105 in the center of the open clamp assembly 125. The robot sends a start signal to the reamer to begin the reaming process. The pneumatic solenoid 340 on the clamp cylinder 115 opens, allowing pressurized air to enter the clamp cylinder 115 and the clamp cylinder 115 extends, causing the clamp assembly 125 to grip the nozzle firmly in alignment with axis A-A and in concentric relation to reaming head 210. The pneumatic solenoid 330 on the air driven motor 130 opens to cause the motor to spin thus rotating shaft 135 and reaming head 210. The pneumatic solenoid 350 on the lift cylinder 155 opens and the lift cylinder extends such that the rotating reaming head 210 moves upwardly along axis A-A for insertion into the nozzle to ream the same. When the lift cylinder reaches the upper reed switch 140 the reaming head has been fully inserted into the nozzle and the lift cylinder reverses direction thus retracting the reaming head 210. The lift cylinder reaches the lower reed switch 145, the motor is turned off, and the clamp cylinder 115 retracts, releasing the nozzle 110 from clamp assembly 125. Finally, the robot moves the nozzle 110 out of the maintenance center.

Figure 9:
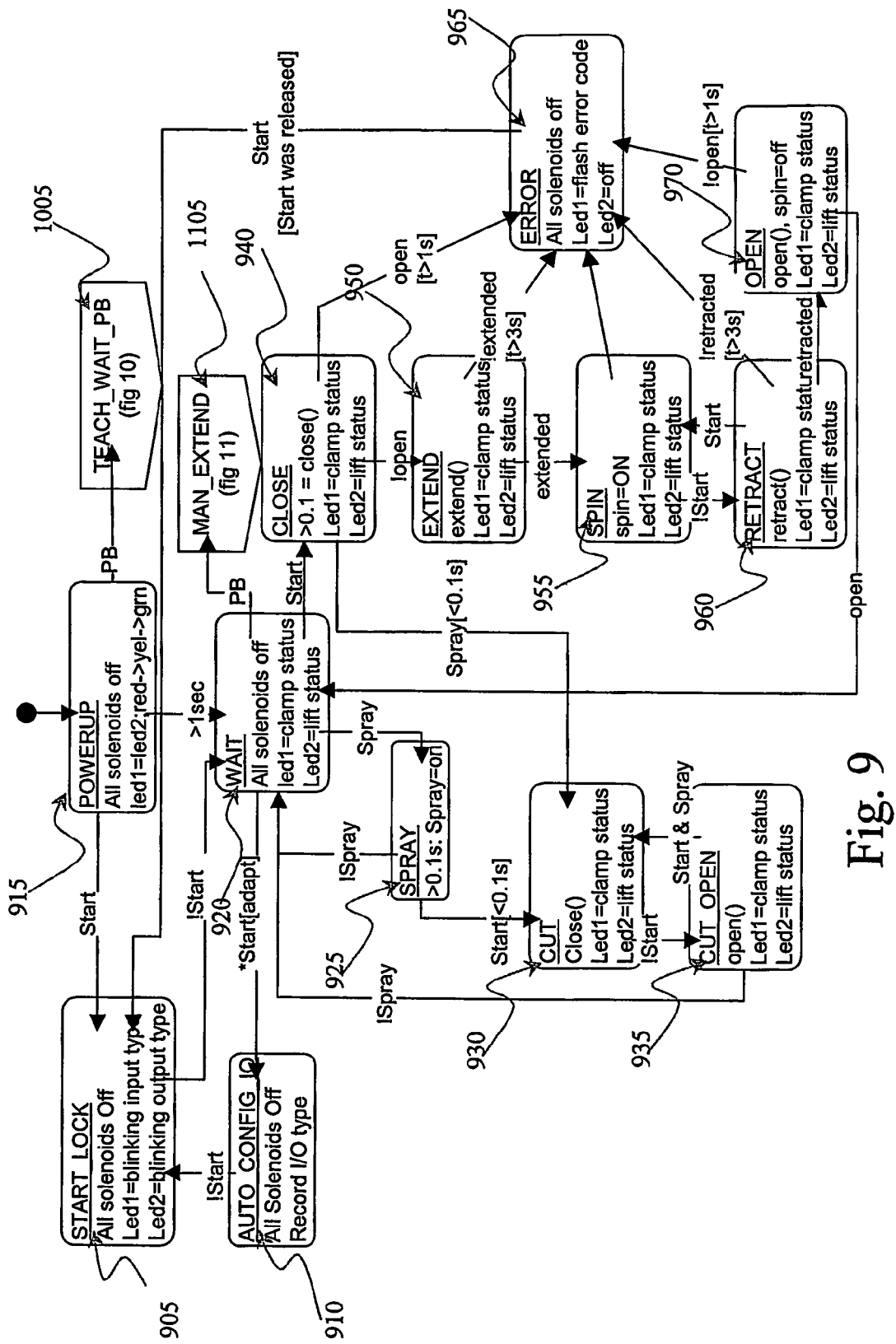
FIGS. 9, 10, and 11 are state diagrams for the operation of the maintenance center.
Figure 12:
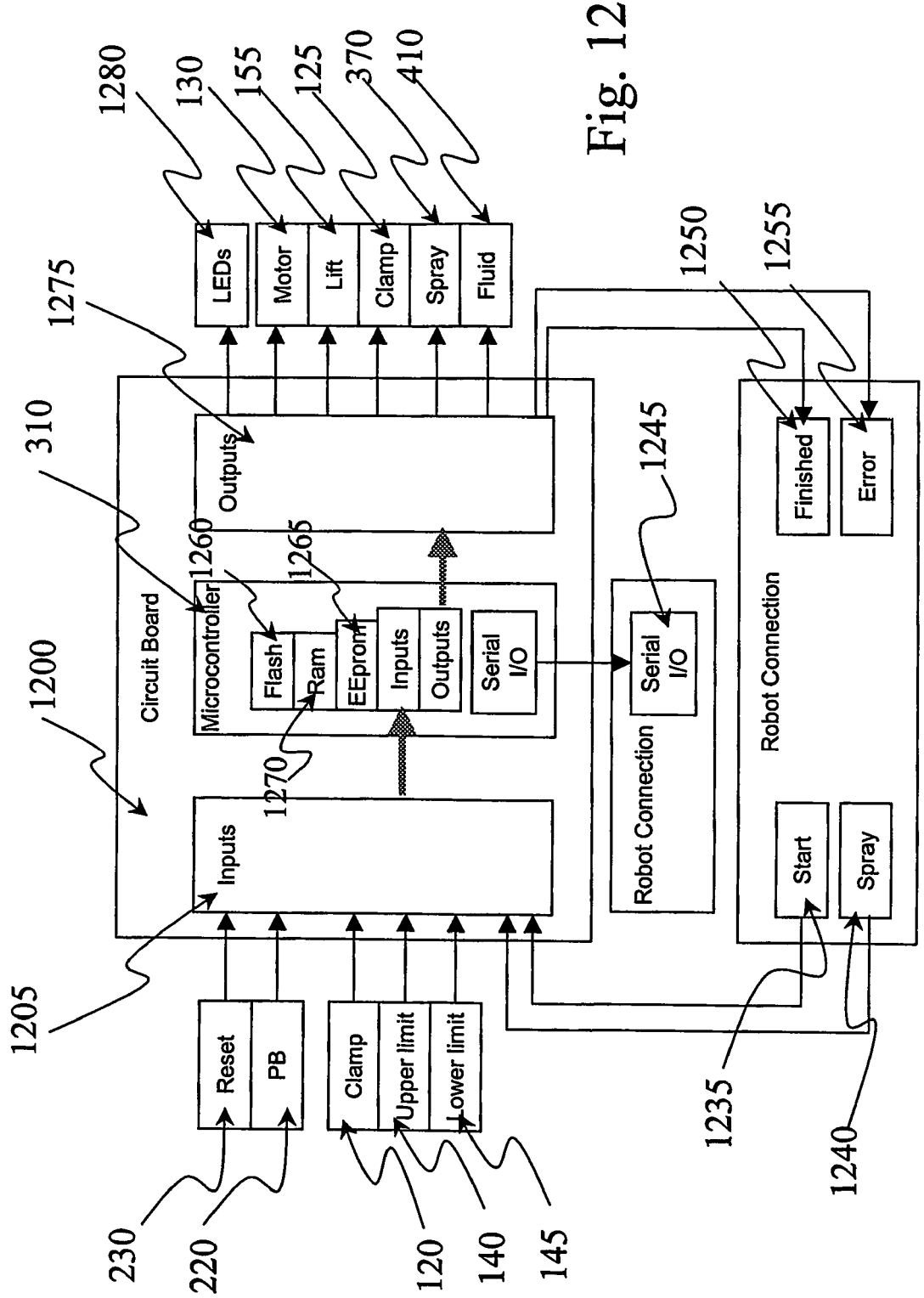
FIG. 12 is a hardware block diagram for a control unit on the maintenance center.
Figure 13:
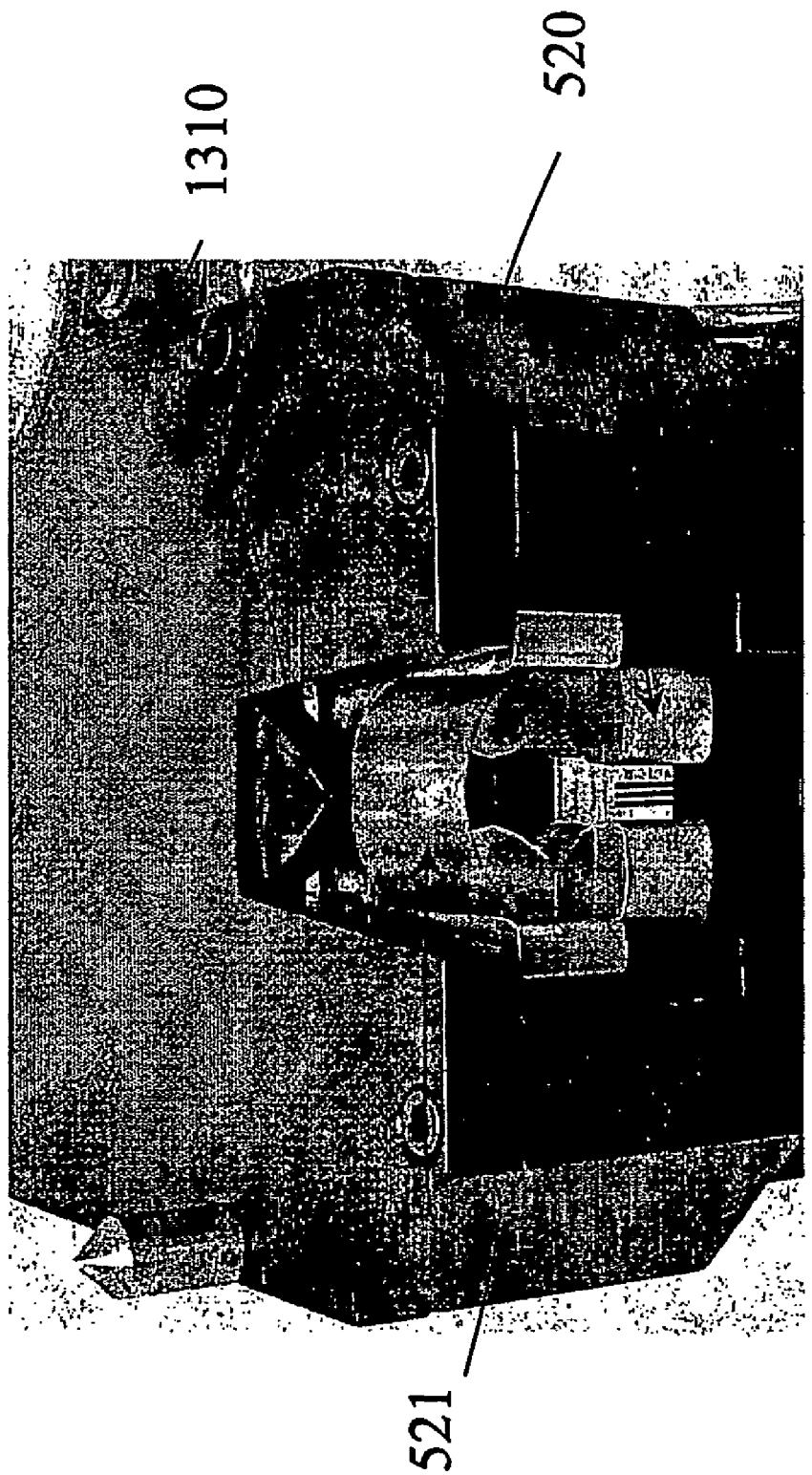
FIG. 13 is a front view of a clamp assembly and a wire cutter in a closed position according to another embodiment of the present invention.
Figure 14:
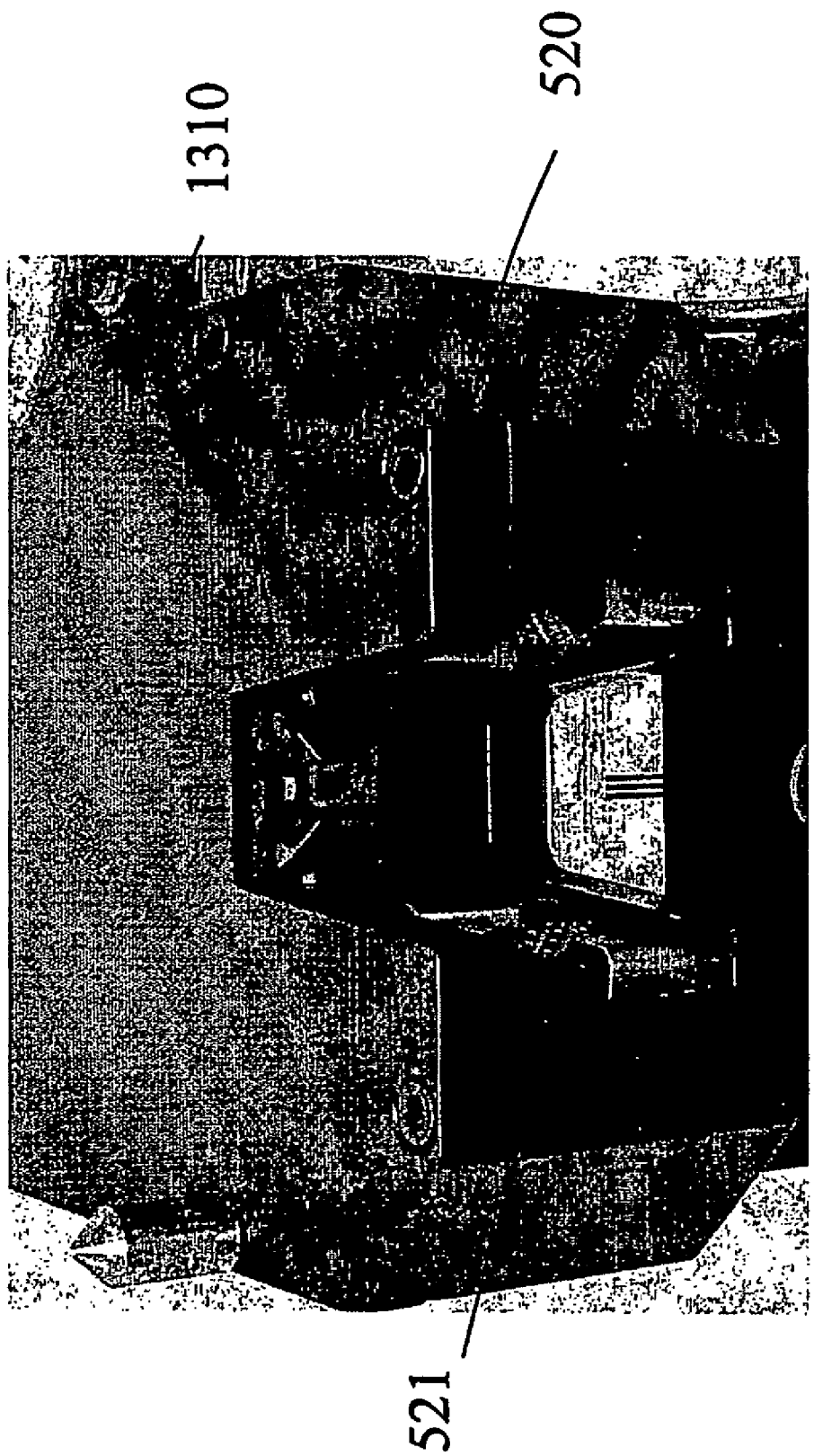
FIG. 14 is a front view of the clamp assembly and the wire cutter of FIG. 13 in an open position.
Figure 15:
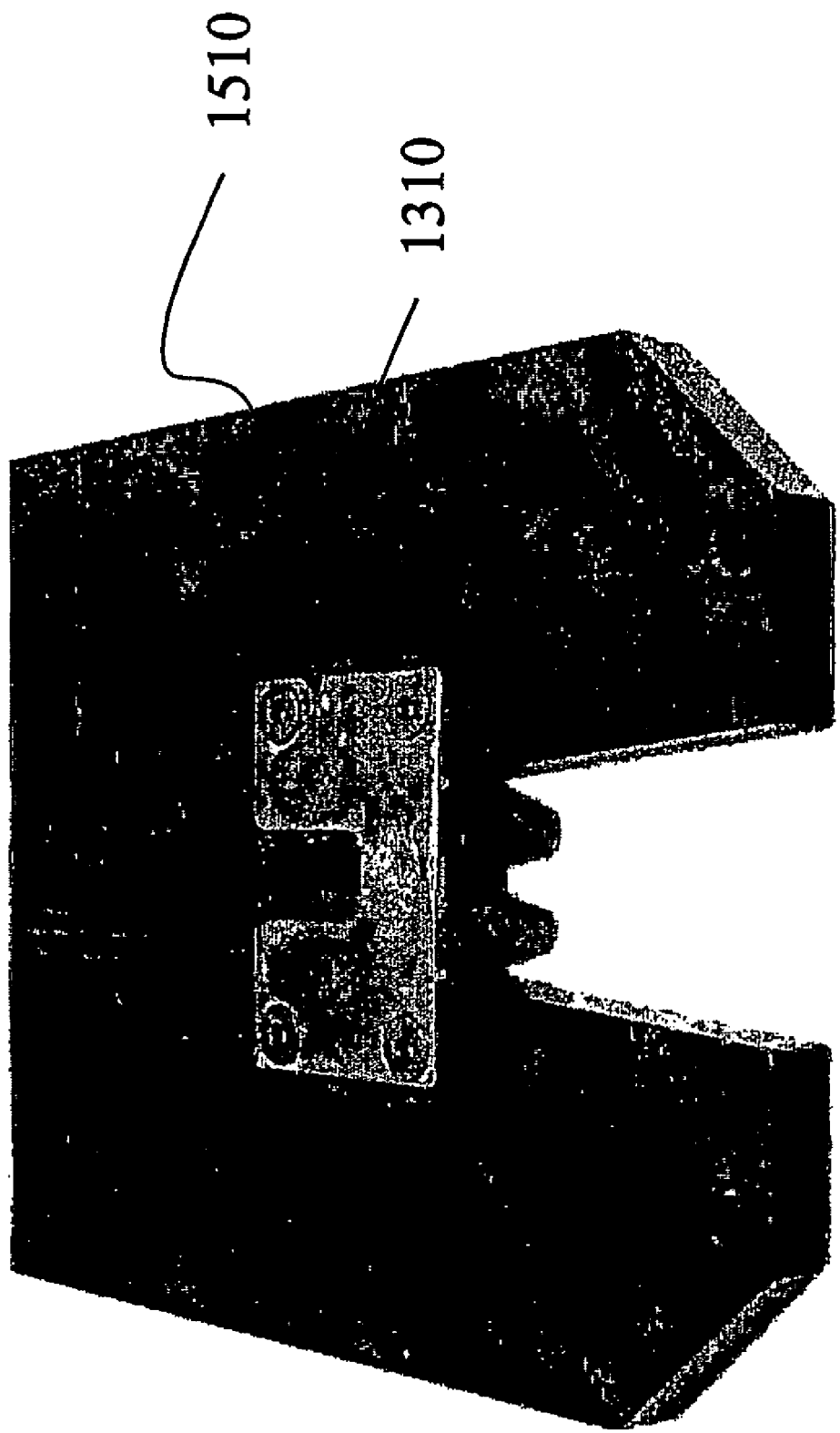
FIG. 15 is a bottom view of wire cutter housing.
Figure 16:
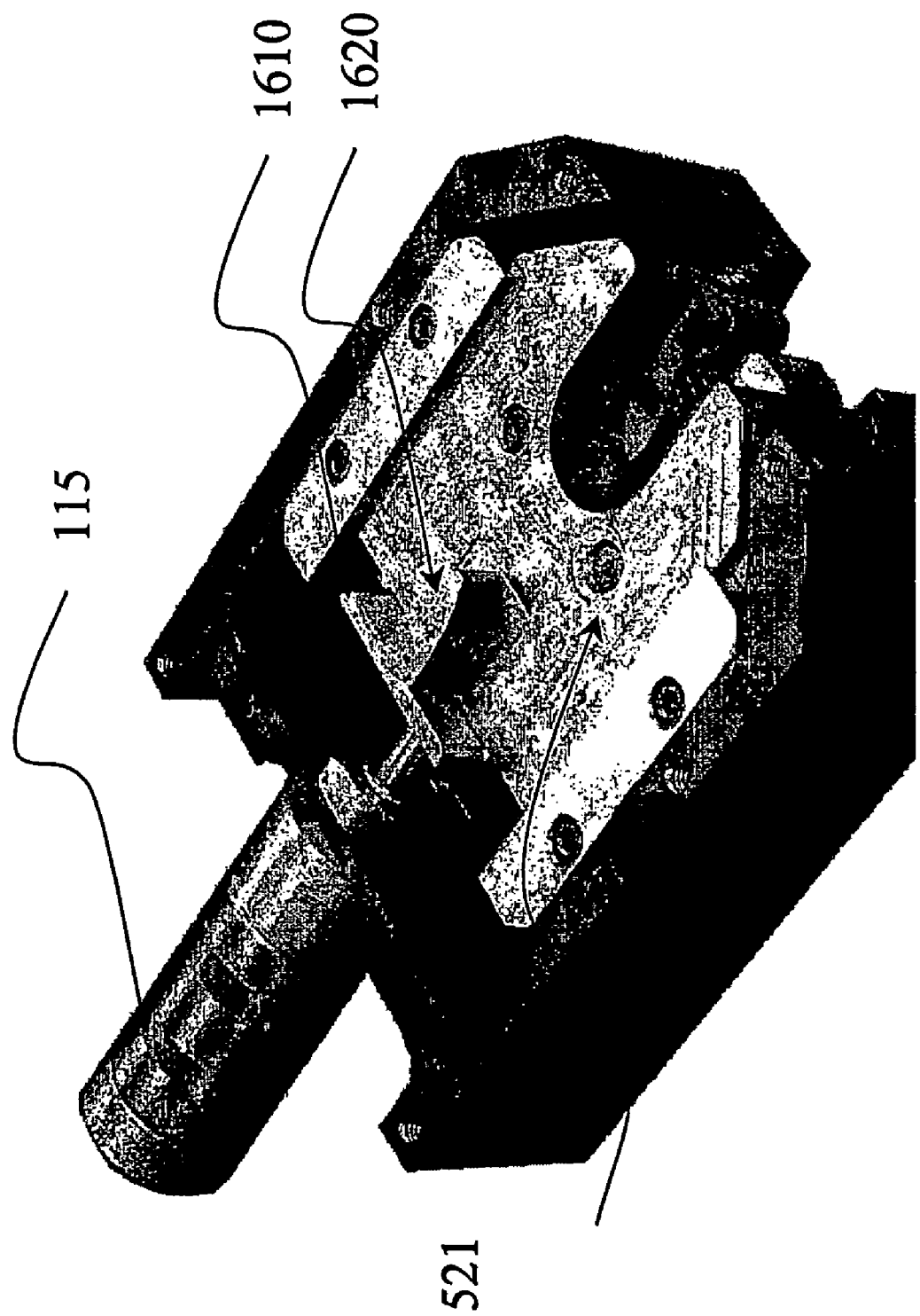
FIG. 16 is an inside view of a wedge actuator in the extended (closed) position.
Figure 17:
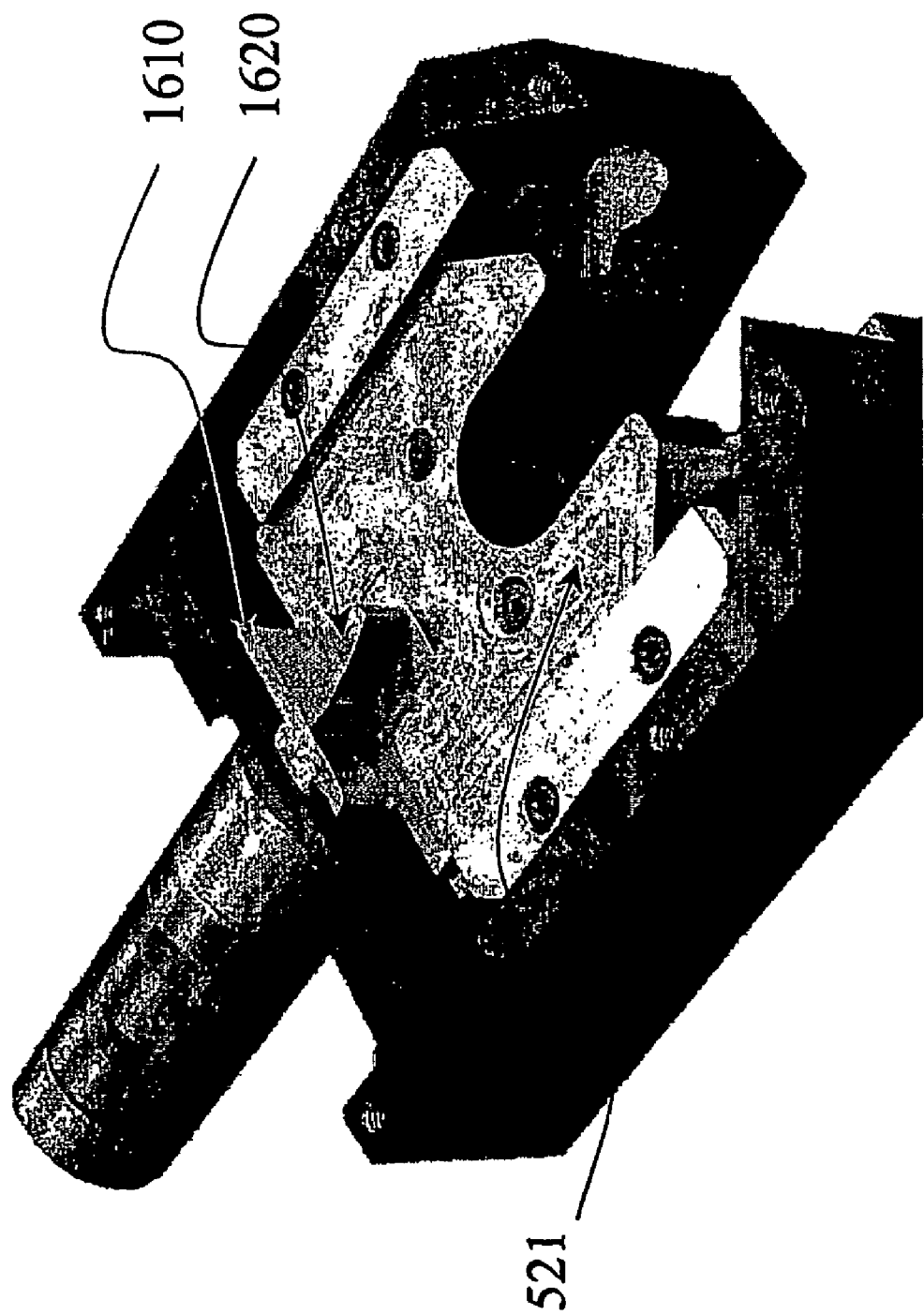
FIG. 17 is an inside view of the wedge actuator of FIG. 16 in the retracted (open) position.

FIG. 9 is a state flow chart for the maintenance center. The functions used in FIG. 9 are: OPEN( ): turn off the clamp cylinder 115, monitor the clamp reed switch 120 to turn on within one second; CLOSE( ): turn on the clamp cylinder 115, monitor the clamp reed switch 120 to turn off within one second. EXTEND( ): turn on the lift cylinder 155, monitor the lower reed switch 145 to turn off within one second; monitor the upper reed switch 140 to turn on within three seconds; RETRACT( ): turn off the lift cylinder, monitor the upper reed switch to turn off within one second, monitor the lower reed switch to turn on within three seconds. Referring to FIG. 12, the events used in FIG. 9 are: START: Start input 1235 active; !START: Start input in-active; *START[adapt]: The START signal is active but in the opposite configurations; (for example if it was set up as sinking but a sourcing signal is present). PB: push button is pressed; !PB: the push button is not pressed; PB[rls]: push button 220 was pressed and released; OPEN: the clamp reed switch is on; RETRACTED: the lower lift reed switch is on; EXTENDED: the upper lift reed switch is on.

Referring to FIGS. 1, 2, 9, 10, 11, 12: At POWERUP state 915 the reamer is powered up. If the push button is pressed during power on, the microcontroller allows the user to set various configurations by entering TEACH WAIT PB state 1005. Holding the pushbutton for 3 to 5 seconds will go to the TEACH_BLOW_OFF_OFF1 state 1070. From this state, the configuration of the blow off feature may be set. Holding the push button for 5 to 7 seconds after POWERUP state 915 will go to TEACH_MODE_AUTO1 state 1010. From this state the mode configuration may be set: dry run, timed, open, blind. Holding the pushbutton for 7 to 10 seconds after POWERUP state 915 will go to TEACH_IO_ADAPT state 1040. The selected configuration is stored in an EEPROM upon entering each of these states. The reamer reenters power up state 915 When the reamer is powered up and there is no Start signal 1235 from an external automation equipment within one second, the reamer enters WAIT state 920. From WAIT state 920 the reamer can be operated manually by press the push button 220, the ream head extends the lift cylinder 155 by entering the MANUAL EXTEND state 1105. If the push button is released, the reamer returns to MANUAL RETRACT state 1120. The sequence of MANUAL WAIT EXTENDED state 1110; and MANUAL EXTENDED state 1115 is used for adjusting the position of the torch nozzle for a robot. The automatic reaming process starts with WAIT state 920 and normally goes through the CLOSE 940 state wherein the clamp closes, the EXTEND state 950 wherein the lift cylinder extends to move reaming head along axis A-A, the SPIN state 955 wherein the reaming head 210 rotates about axis A-A, the RETRACT state 960 wherein the lift cylinder retracts and moves reaming head 210 downwardly and the OPEN state 970 where the clamp assembly 125 opens to release the nozzle. During each state the success of the operation is monitored, non-completion of an operation within specified time limits (one second for CLOSE and OPEN states, 3 seconds for EXTEND and RETRACT states) results in the reamer entering the ERROR state 965. Successful completion of OPEN state 970 returns the reamer to WAIT state and the process can start again. Not shown in FIG. 9 is a state transition between EXTEND state 950 and RETRACT state 960. If the reamer stays longer than 150% of a rolling average of the EXTEND state 950 and a maximal retry number is not reached, the reamer enters the RETRACT state 960 and retries the reaming process.

Figure 3:
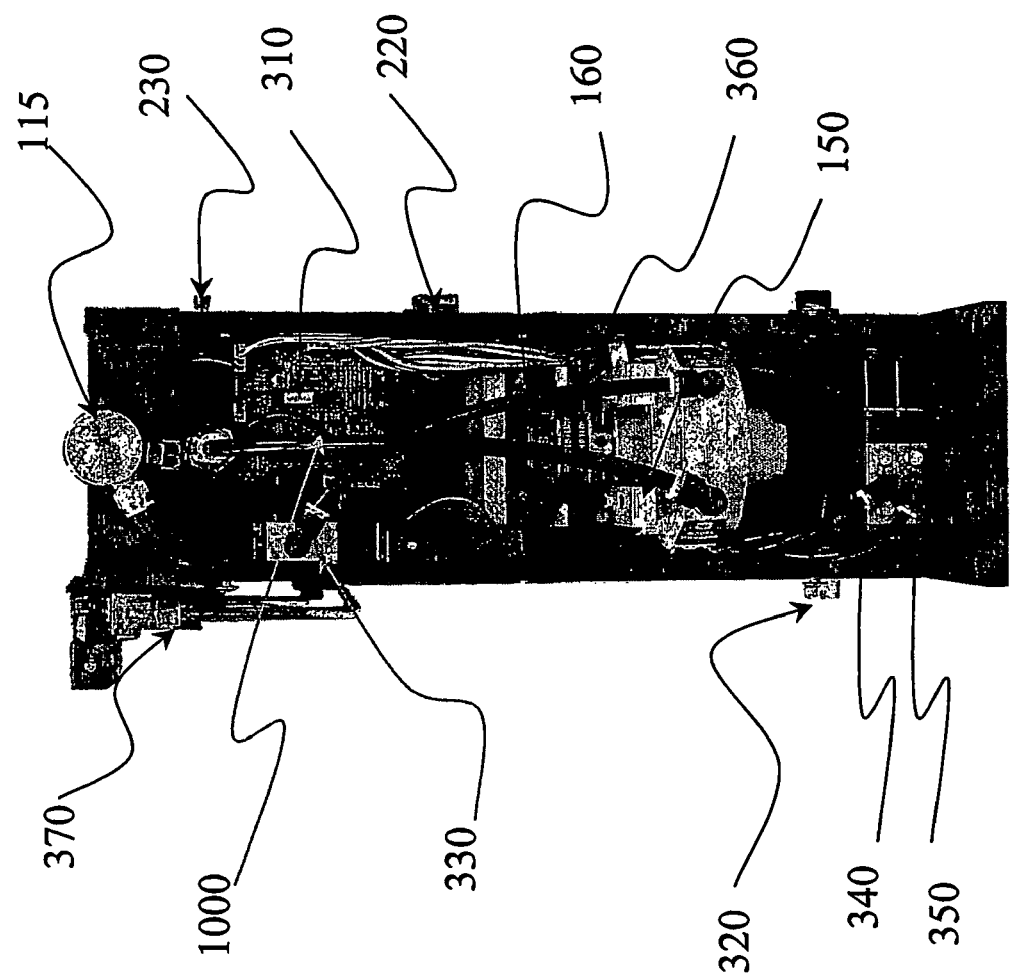
FIG. 3 is a rear view of a preferred embodiment of a maintenance center according to present invention.
Figure 4:
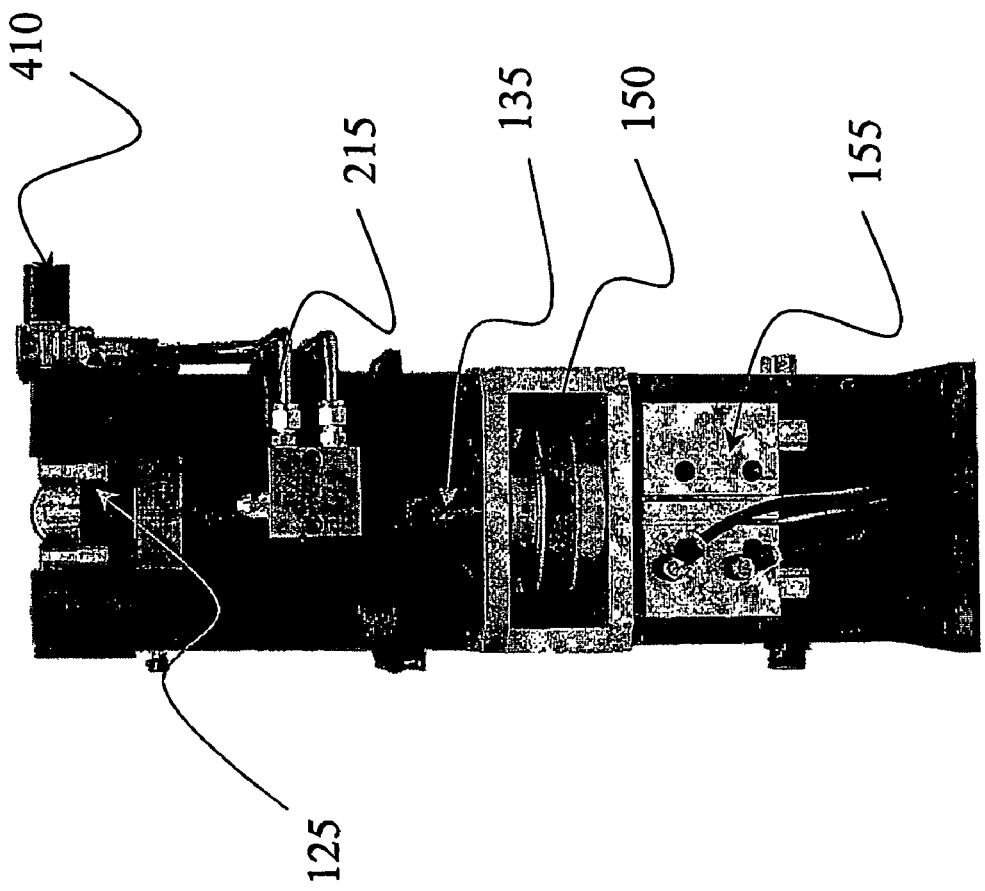
FIG. 4 is an exposed front view of a preferred embodiment of the maintenance center.

Referring to FIGS. 1, 3 and 12, the torch maintenance center uses a microcontroller 310 in a control unit 1200 to control the solenoid valves that activates the cylinders. Three reed switches 140, 145, 120 are connected to inputs on the microcontroller. The microcontroller monitors the sequence as described above by sending and receiving information related to the positions of the clamp cylinder 115 and the lift cylinder 155. This technique allows real-time diagnostics of the operational sequences of the torch maintenance center as described in FIG. 9. While the clamp cylinder is engaged, the clamp reed switch 120 is expected to change state within one second. Similarly, when the lift cylinder is engaged both the lower reed switch 145 and the upper reed switch 140 are expected to change state within three seconds. After the upper reed is reached the lift cylinder disengages to lower the frame assembly. The torch maintenance center transmits a success indication 1250 to the robot or other automation equipment upon completion of the event sequence within pre-programmed time.

The electronic operation controller, preferably in the form of a microcontroller, monitors and controls the entire reaming process by receiving and evaluating the information received from the reed switches placed on the clamp cylinder and lift cylinder. The microcontroller ensures that the completion signal sent from the reamer to the robot is an indication of successful completion of the every step of the reaming process. The recording of completed reaming cycles allows for the scheduling of the maintenance work for the reamer. Accordingly, the microcontroller provides an error signal to the robot for failure to complete the reaming process.

The microcontroller assigns a unique time-out value to each event, and a unique error code to each type of error. Referring to FIGS. 9 and 12, upon occurrence of a severe error during a reaming process 965, the torch maintenance center stops the reaming process by disengaging the clamp cylinder, lift cylinder, and the motor. The information regarding the premature termination of the reaming process is indicated to the user through flashing of indicator lights 1280 in a predetermined sequence and frequency. Information related to the fault occurrence can also be sent to a robot 1255 or other automation equipments through a communication network 1245.

Excessive spatter built up in the nozzle causes the torch maintenance center in this invention to automatically retry the reaming process. In this case the motor may stall during the reaming process and the lift cylinder may not extend to its entire length. The microcontroller monitors the duration of the time for the carriage assembly to raise from the lower reed switch 145 to the upper reed switch 140. If excessive time is detected the microcontroller can lower the lift cylinder, and raise it again to retry the reaming process.

The microcontroller also monitors the pressure of the pneumatic air supply by keeping track of retraction time. It also monitors the speed of the reaming motor and rectifies reaming problems such as stalling by retrying.

The microcontroller monitors indirectly the drop in the air supply line pressure while the frame assembly is being lowered. This operation is expected to complete within the same amount of time during each reaming process. The average time required is calculated and stored. In case the average time is exceeded by a certain amount the microcontroller detects it and correlate to the decrease of the air supply pressure.

The electronic operation controller or microcontroller can help the user to troubleshoot the system by providing an error code, in this preferred embodiment by flashing the LED in predetermined sequences and frequencies.

The microcontroller provides the ability to monitor speed feedback from the reaming motor from a tachometer or other speed measuring devices. The microcontroller analyzes the speed information to determine whether a stall has occurred, to predict a stall and to recommend an automatic retry.

The maintenance center uses solid state transistors to operate the pneumatic solenoids for enhanced reliability. The use of transistors allows pulse width modulation for the pneumatic solenoids, minimizing the average amount of current drawn from the robot power supply to power the solenoids.

A solenoid typically requires more current to initiate and move the piston than to hold the piston. The pulse width modulation technique enables different duty cycles to be used for initializing phase and holding phase, resulting in different amount of average current to each solenoid at different times. The microcontroller ensures that only one of the solenoids is in initializing phase, or the overlap of the initializing phases between the solenoids is minimal. The advantage of this invention over other systems is a minimal current draw from the robot's power supply.

The torch maintenance center provides an improvement for the proper positioning of the torch nozzle for reaming by allowing the operator to configure the reaming operation such that the motor does not operate in order to test run the operation. Existing systems require 'trial and error' tests to position the torch nozzle about the reaming head. Incorrect programming of the position results in destructive consequences to the nozzle or the torch. This embodiment makes it easy to program the proper position at the point of use by separating the movement of the lift cylinder and the spinning of the reaming head.

The microcontroller allows the use of a single push button to control the raising of ream head, gripping of the nozzle, releasing of the nozzle, and lowering of the ream head. Referring to FIGS. 2 and 9 there is provided a push button 220 for sequencing the torch maintenance center through the following steps:

Press and hold the button 220 to lift the frame assembly 150 without turning the motor until the lift cylinder is fully extended and the upper reed switch 140 changes state (902); move the robot to properly position the nozzle 110 around the reaming head 210;

Press the button to close the clamp assembly 125 (906), release the button to open the clamp (908). This helps the user to verify that the correct orientation of the nozzle is programmed for a flush grip of the clamp on all four sides.

Figure 7:
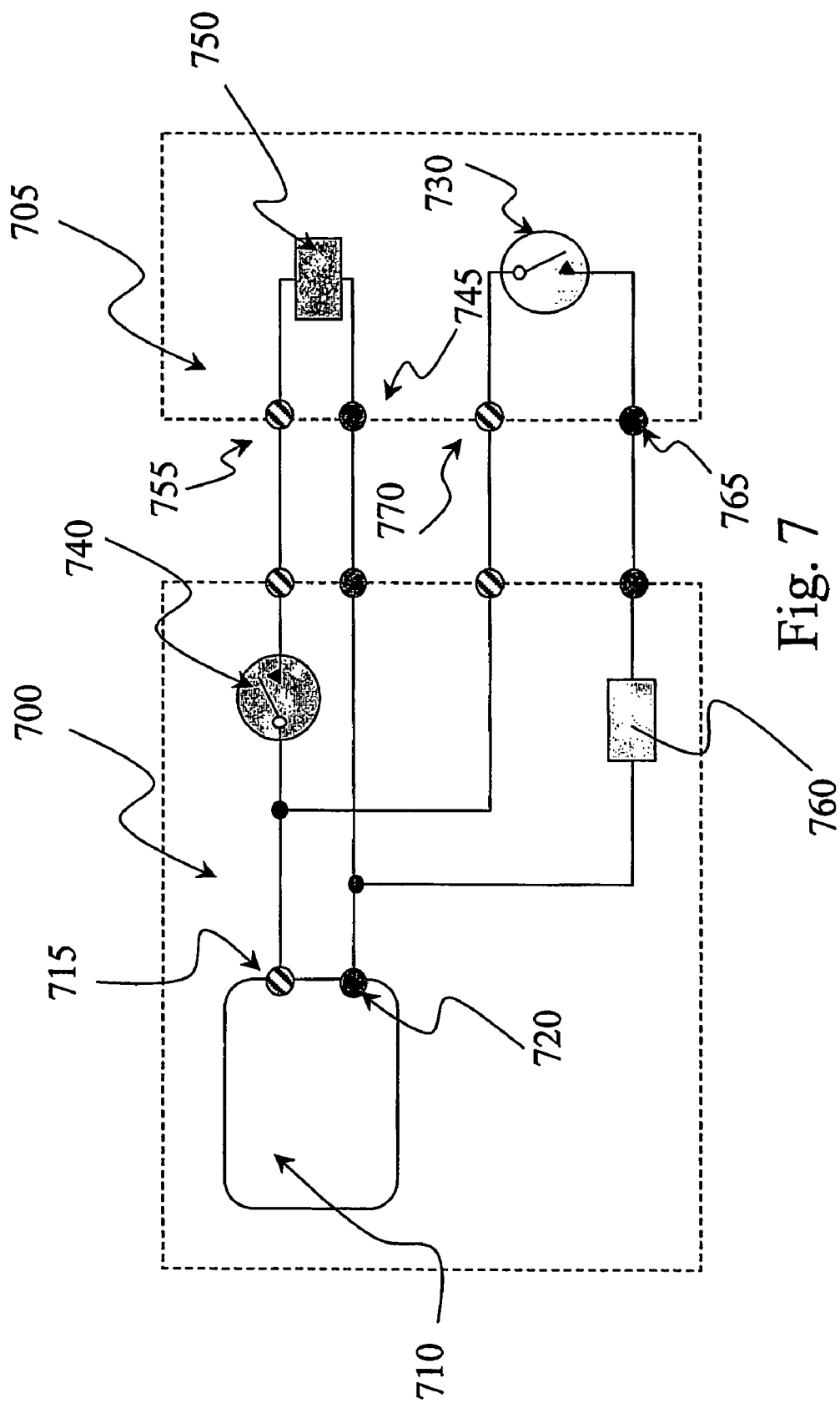
FIG. 7 is a schematic for the I/O of the maintenance center.

The present invention provides automatic configuration of the sinking and sourcing inputs and outputs between a reamer and a robot or other automation equipment. Referring to FIG. 7 now, the power for reamer 705 is supplied by a power supply 710 located on a robot 700. The start of the reaming process is signaled through a relay 740 on the robot, if the relay 740 is closed, power is provided to an input 750 on the reamer.

When the reaming process is finished, a control relay 730 on the reamer is closed, sending a controlling signal to an input 760 on the robot. The polarity of the power supply on the robots may have different configuration, i.e. if a pole 715 connecting to the relay 740 has a positive voltage, and a pole 720 connecting to the power consumption unit 760 has a zero voltage, the configuration is called 'sourcing I/O'. If the pole 715 has a zero voltage and the pole 720 has a positive voltage, it is called 'sinking I/O'.

This system automatically detects the I/O type on an input 750 and configures the output 730 accordingly. When an active 0V signal is sensed at the input 750 a sinking I/O type is ascertained and the sinking transistor inside 730 is utilized when the output is active. When an active positive signal is sensed at the input 750 a sourcing 110 type is ascertained and the sourcing transistor is switched on when the output is to be active.

Figure 8:
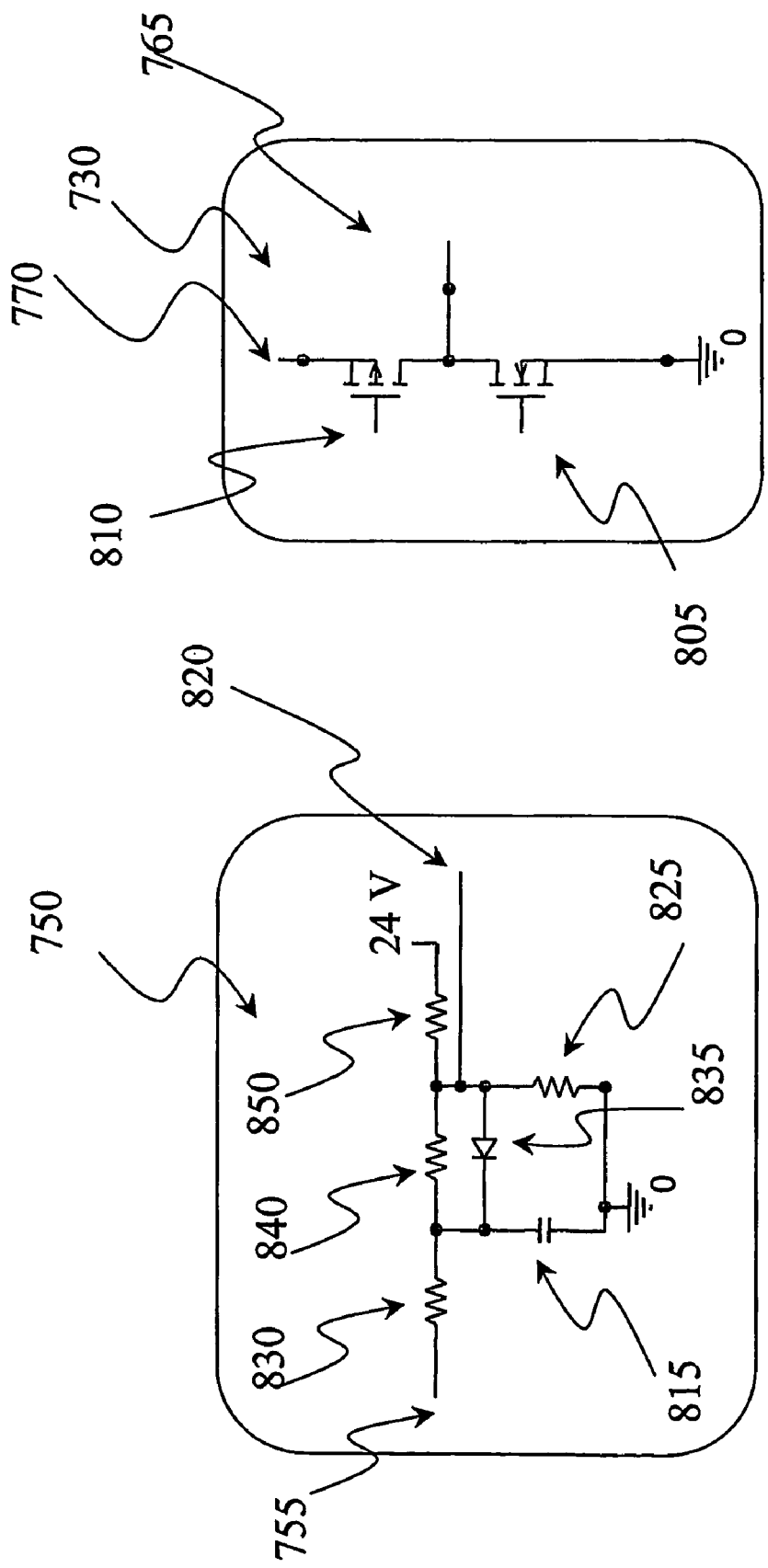
FIG. 8 is a schematic of a circuit for determining the polarity of the robot interface.

Referring now to FIGS. 7 and 8, two resistors 850 and 825 bias the voltage at input 820 to 2.5V when there is no connection at input 755 (floating). When the robot sends a +24V output signal to input 755, the voltage at input 820 is +5V, when the robot sends a 0V signal the voltage at input 820 is +0.7V. The input voltage is connected to an analog to digital converter so that the 3 different voltage levels are ascertained. The microcontroller is programmed to look for a positive or negative transition as an active start signal, or it is programmed to look for a signal that is different than the voltage level present at the time of power-up. The I/O type information is stored in non-volatile EEPROM memory so that this learning process need only be performed once. If the maintenance center is moved to a different robot with a different I/O configuration, the microcontroller senses a different pattern occurring on the input 820 and re-teaches the I/O type.

Depending on the type of I/O detected from the input 750, either transistor 810 or transistor 805 is switched on when the output 730 is to be active. If the I/O type is sinking, then transistor 805 is used, if the I/O type is sourcing then transistor 810 is used.

Figure 10:
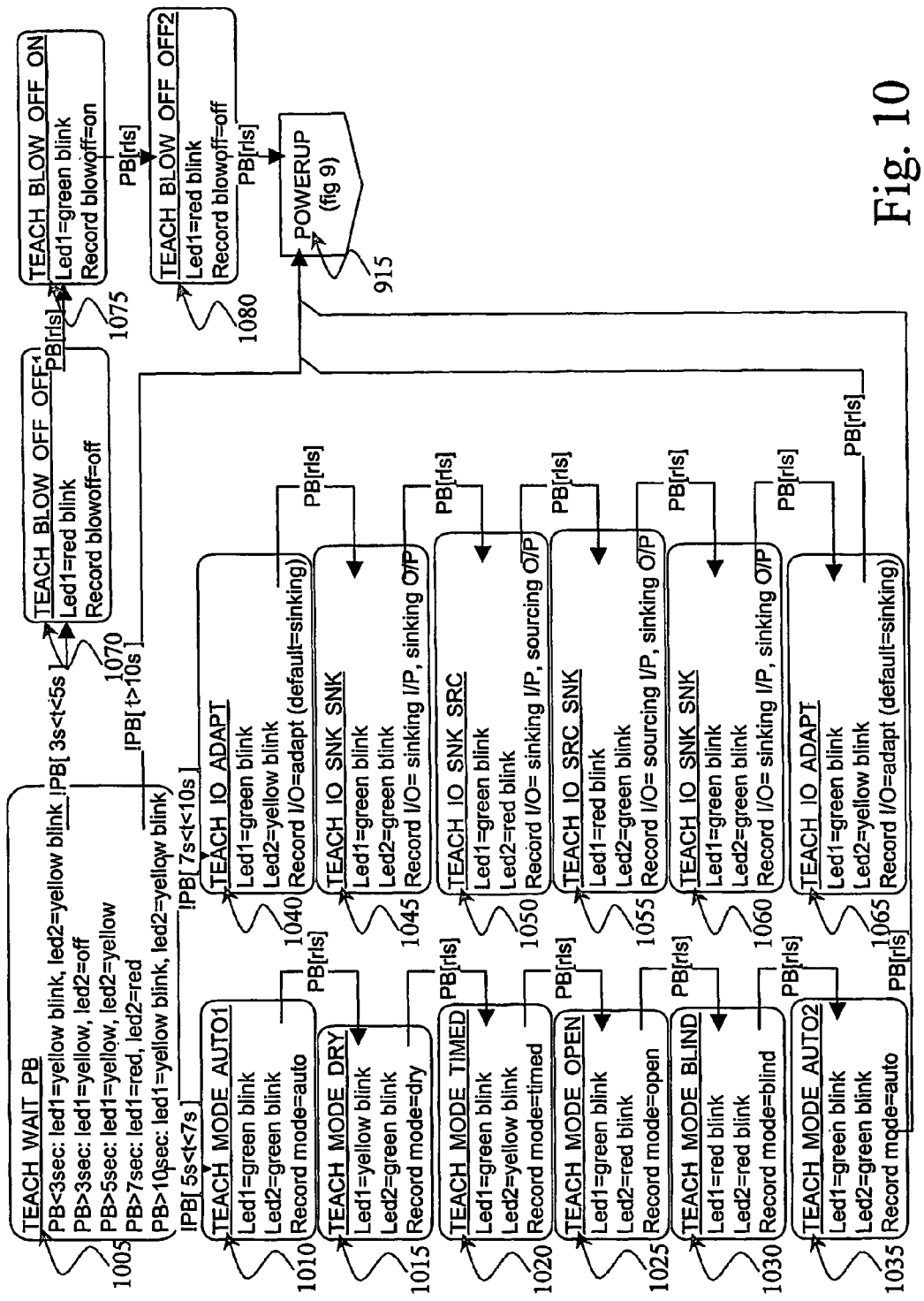
Figure 11:
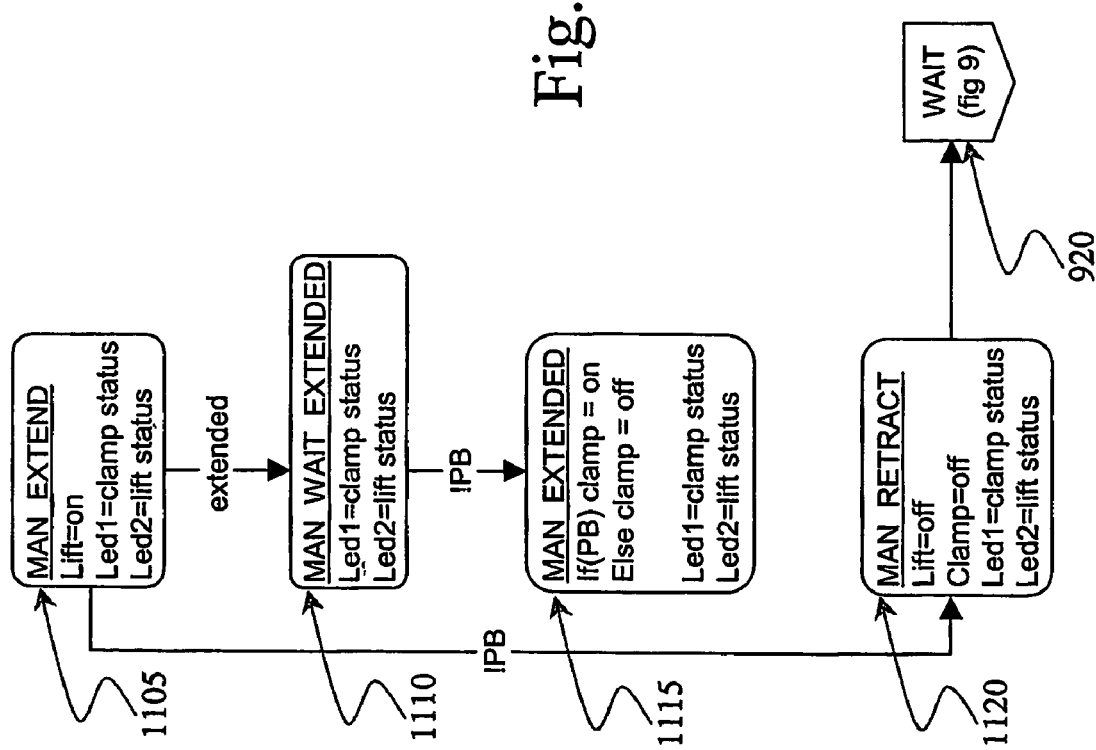

Other I/O type combinations on the input and output (sinking input/sourcing output, or sourcing input/sinking output) may be configured by manually configuring the I/O using the external pushbutton 220 at the time of power-up. Referring to FIG. 10, if the pushbutton is pressed at the time of power-up this generates a unique event, as in normal operation this would not happen. The reamer is in a state 1010 waiting for the push button to be pressed again. When this event occurs the microcontroller is stepped through 4 different types of I/O configurations 1015, 1020, 1025, 1030 by subsequently depressing the push button. The I/O configuration type is indicated with the indicator lights or other forms of indication. The I/O type information is stored in non-volatile EEPROM memory so that the manual configuration is only required once. When the user sees the I/O configuration type desired, the reamer is reset by either pressing a reset button 230 or by recycling power. If the user steps through all 4 configurations, the $5^{th}$ and last option is "auto configuration mode" 1065 which is a way of restoring the I/O configuration back to factory default settings.

The maintenance center provides a spray mechanism for spraying the inside bore of a welding nozzle with anti-spatter spray comprising (a) spray solenoid for regulating air flow to spray nozzle, (b) fluid solenoid for regulating fluid flow to the spray nozzle, (c) spray nozzle for atomizing the fluid from the pressurized air stream.

The maintenance center includes a high velocity, pressurized air stream easily accessible to the torch nozzle that may be used to cool the nozzle. The microcontroller controls the operation of the air motor and the exhaust from the air motor is used in this aspect where purposefully mounted.

The maintenance center provides a means to blow away the over spray from the antispatter spray nozzle as it is falling. By entering TEACH_BLOW_OFF_ON state 1075 the air motor is turned on for two seconds after the spray is activated. The exhaust of the air motor is directed toward the spray nozzle so that overspray and after spray is blown away from the torch maintenance center.

The maintenance center combines the air and liquid streams on the outside of spray nozzle and has the ability to operate them independently. This allows for a pre-flow of the air stream to clean off any debris on the spray nozzle and also a post flow of air stream to draw in and dry up a remnant droplet of fluid. The post flow may also act to dry the mist of anti spatter fluid existing on the inside bore of the nozzle left immediately after spraying. In spray state 925 both the fluid and air solenoids for the sprayer are turned on. When the spray signal is turned off from the automation equipment the air solenoid is kept on for one second to act as a postflow of air. This setup also allows pulsating the fluid solenoid while the spray operation is in progress to avoid over-spray.

The maintenance center monitors the fluid level in one of two ways and alerts the robot when it is time to refill the fluid. A fluid level sensor may be attached to the fluid reservoir or the spray time may be accumulated in the microcontroller so that when a request to spray is received an error signal is output to indicate a low level.

The maintenance center allows the operator to configure the reaming operation such that the motor does not operate. This will allow the operator to check the gripping and up/down motion of the reaming head without the reaming head spinning. This is done by entering TEACH_MODE_DRY state 1015. With this feature in enabled state, the air motor does not spin during EXTEND state 950, SPIN state 955, or RETRACT state 960.

One or more sensors can be bypassed in order to troubleshoot or keep the station in operation until a defective sensor can be replaced.

If a reed switch is malfunctioning it may be bypassed by entering a mode configuration state. If TEACH MODE TIMED state 1020 is entered, the extended sensor 140 is ignored. If TEACH MODE OPEN state 1025 is entered, the retracted sensor 145 and the extended sensor 140 are ignored. If TEACH MODE BLIND state 1030 is entered the extended sensor 140, the retracted sensor 145 and the open sensor 120 are ignored.

Referring to FIG. 13 to 17 shows a wire cutter mechanism 1310 integrated into the clamp assembly. When the clamp cylinder 115 is activated a wedge 1620 is extended into wire cutter arms 1310 which separates them on the wedge side and closes them on the cutter side. The angle of the wedge multiplies the force applied by the clamp cylinder to the wire cutter arms. Referring also to FIG. 9, when the start signal is activated from the automation equipment, the CLOSE state 940 is entered. If the spray signal is activated within 0.1 seconds then CUT state 930 is entered. Similarly, when the spray signal is activated from the automation equipment the SPRAY state 925 is entered. If the start signal is activated within 0.1 seconds then CUT state 930 is entered. In the cut state the clamp cylinder is extended which in effect closes the wire cutters. When the start signal is deactivated, CUT OPEN state 935 is entered and the clamp cylinder is retracted. From this state when the spray signal is deactivated then WAIT state 920 is entered. This provides a means to isolate the wire cutter action from reaming and spraying actions.

The present invention provides a means to integrate the wire cutter with the nozzle reamer and isolate the signals to start each process.

The maintenance center provides means for a touch sensor mechanism for positive location verification of the tip of the wire (normally called the tool center point or TCP). When the tip of the welding wire touches this sensor the unit will feedback a signal integrated with the "finished" signal to the robot.

The maintenance center provides a means for an integrated tool center point check for positive location verification of the end of the wire when it touches the vertex and the signal is integrated with other output signals from the torch maintenance center. The activation signal may be in the form of a mechanical switch or other touch sensor such as capacitive, electromagnetic or optical.

FIG. 12 is a hardware block diagram of the control unit for the reamer. On a circuit board 1200 there is provided an input interface 1205 and there is an output interface 1275. The microcontroller has built-in flash memory 1260, RAM 1270 and EEPROM 1265. Connected to the input 1205 interface are a reset button 230 and a push button 220. Three reed switches are connected to the input 1205 interface as well: the clamp cylinder switch 120, the lift cylinder switches 140 and 145. There are four control and signal lines between other automation equipment and the reamer: a start line 1235, a spray line 1240, a finished line 1250 and an error line 1255. LEDs 1280 are connected to an output in 1275. Five solenoids are also linked to the output interface: the motor solenoid 330, the lift solenoid 350, the clamp solenoid 340, spray solenoid 370, and fluid solenoid 410.

The maintenance center provides a means to bypass one or more sensors in order to troubleshoot or keep the station in operation until a defective sensor can be replaced.

The maintenance center allows the operator to configure the reaming operation such that the motor does not operate. This will allow the operator to check the gripping and up/down motion of the reaming header without the reaming bit spinning.

The maintenance center provides proximity sensors for each operative mechanism (reaming header, sprayer, wire cutter). The maintenance center allows the proximity signals to be time delayed or de-bounced in order to ensure the stable presence of the nozzle. The maintenance center also allows the proximity signals to be bypassed so that the positions may be taught without first disconnecting the power supply.

The maintenance center also provides visual feedback that the taught position is correct by diagnostic LEDs. The maintenance center can be configured to activate the operative mechanism corresponding to a proximity sensor when a pushbutton is pressed and the sensor is activated in order to verify the taught position.

The present invention also includes a high velocity pressurized air stream easily accessible to the torch nozzle that may be used to cool the nozzle.

The present invention provides a means to attach proximity sensors to the unit for detecting the presence of a torch at or near the operative mechanism and activate the operative mechanism accordingly.

The present invention further uses network to communicate between a reamer and a robot or a setup pendant.

What is claimed is:

1. A maintenance center for cleaning a welding torch nozzle comprising:
a chassis;
a reaming assembly mounted on the chassis including:
a lifting mechanism advancing and retracting a reaming head;
a driving motor rotating the reaming head for reaming a nozzle about a rotation axis;
a clamp assembly for holding and centering the nozzle, the clamp assembly comprising:
a slider and a pair of jaws pivotally coupled to the slider, the slider movable in a direction substantially transverse to the rotation axis, wherein the movement of the slider toward and away from the rotation axis moves the pair of jaws substantially transverse to the rotation axis and the slider movement; a pair of pins movably coupled with the slider, for opening and closing the jaws in conjunction with the movement of the slider; and
an actuating mechanism for opening and closing the clamp assembly, the actuating mechanism being coupled to the slider;
an electric input; and
an electronic operation controller controlling the reaming assembly, the controller having a single-input teaching mode and a reaming mode, wherein during the single-input teaching mode, the controller permits manual sequencing of each step of the reaming mode without activating the driving motor by operating the electric input, and at each step, storing the position of the lifting mechanism, the clamp assembly and the actuating mechanism to be used during the reaming mode.

2. The maintenance center according to claim 1, wherein the electronic operation controller comprises a microcontroller.

3. The maintenance center according to claim 1, wherein the electronic operation controller is capable of detecting an abnormality and responding thereto by taking a corrective action.

4. The maintenance center according to claim 1, wherein the electronic operation controller detects any abnormal decrease of the motor speed during a reaming process and controls the lifting mechanism to initiate the corrective action by retracting and re-advancing the reaming head.

5. The maintenance center according to claim 1, wherein the electronic operation controller detects any abnormal lapse of time during advancing and retracting of the reaming head between the selected positions and responds thereto by abandoning or retrying the reaming process.

6. The maintenance center according to claim 1, wherein the electronic operation controller has pre-determined or rolling average internal values for operational events for detecting selected abnormalities.

7. The maintenance center according to claim 1, wherein the electronic operation controller reduces power consumption by eliminating temporal overlap between an initialization of the motor and an initialization of the lifting mechanism and the actuating mechanism.

8. The maintenance center according to claim 1, wherein the electronic operation controller detects polarity of inputs and outputs between the maintenance center and an automation equipment and configures the maintenance center to proper polarity.

9. The maintenance center according to claim 1, wherein the electronic operation controller further comprises:
signaling means for communicating with an operator or an automation equipment.

10. The maintenance center according to claim 9, wherein the signaling means is wireless.

11. The maintenance center according to claim 9, wherein the signaling means is a serial communication link.

12. The maintenance center according to claim 1, further comprising:
a spray mechanism for applying anti-spatter fluid to the torch nozzle.

13. The maintenance center according to claim 12, further comprising means for supplying pre flow of air for removing debris, and a post flow of air for removing over-spray of the anti-spatter fluid.

14. The maintenance center according to claim 12, wherein the anti-spatter fluid is applied by pulsating flow by toggling fluid and air solenoids.

15. The maintenance center according to claim 1, wherein the exhaust from the motor is used to supply cooling air to the torch nozzle.

16. The maintenance center according to claim 12, further comprising: a sensor for monitoring a level of the anti-spatter fluid.

17. The maintenance center according to claim 1, further comprising a wire cutter.

18. The maintenance center according to claim 17, further comprising means for an integrated tool center point check for positive location verification of the end of a wire; wherein the wire touches a vertex and an activation signal is sent with other output signals.

19. The maintenance center according to claim 18, wherein the activation signal is selected from the group consisting of mechanical sensor, capacitive sensor, electromagnetic sensor and optical sensor.

20. The maintenance center according to claim 1, further comprising a proximity sensor for detecting the presence of a torch and for activating the maintenance center.

21. The maintenance center according to claim 1, wherein the lifting mechanism comprises:
a lift cylinder for lifting and lowering the reaming head.

22. The maintenance center according to claim 21, wherein the electric input is connected to the electronic operation controller for advancing the lift cylinder without rotating the reaming head.

23. The maintenance center according to claim 22, wherein the lifting mechanism comprises:
a solenoid for controlling the lift cylinder, the solenoid being controlled via the electronic operation controller.

24. The maintenance center according to claim 1, wherein the actuating mechanism comprises:
a cylinder assembly operably connected to the clamp assembly, the clamp assembly opening or closing in dependence upon movement of the cylinder assembly.

25. The maintenance center according to claim 24, wherein the actuating mechanism comprises:
a solenoid for extending the clamping cylinder and slider assembly,
the solenoid being controlled via the electronic operation controller.

26. The maintenance center according to claim 1, wherein the actuating mechanism comprises:
a first sensor for sensing the movement of the lifting assembly, and
wherein the lifting mechanism comprises:
a second sensor for monitoring the position of the reaming head, the electronic operation controller controlling the operation of the maintenance center based on at least one of the output of the first sensor, the output of the second sensor.

27. The maintenance center according to claim 1, wherein the operation controller monitors a speed of the reaming head.

28. The maintenance center according to claim 1, wherein the electric input is a push button.

* * * * *